United States Patent
Hill et al.

(10) Patent No.: US 9,637,031 B2
(45) Date of Patent: May 2, 2017

(54) BODYREST

(71) Applicant: Hypnap LLC, Waltham, MA (US)

(72) Inventors: Chloe Hill, Waltham, MA (US); HyukJae Henry Yoo, Leonia, NJ (US); John Lonczak, Newburgh, NY (US)

(*) Notice: Subject to any disclaimer, the term of this patent is extended or adjusted under 35 U.S.C. 154(b) by 115 days.

(21) Appl. No.: 14/680,864

(22) Filed: Apr. 7, 2015

(65) Prior Publication Data

US 2015/0282628 A1    Oct. 8, 2015

Related U.S. Application Data

(60) Provisional application No. 61/976,563, filed on Apr. 8, 2014, provisional application No. 62/127,612, filed on Mar. 3, 2015.

(51) Int. Cl.
| | |
|---|---|
| A47C 20/02 | (2006.01) |
| A47C 20/04 | (2006.01) |
| B60N 2/44 | (2006.01) |
| B60N 2/48 | (2006.01) |
| B60N 3/00 | (2006.01) |
| A47C 7/38 | (2006.01) |

(52) U.S. Cl.
CPC ............. *B60N 2/44* (2013.01); *A47C 7/383* (2013.01); *A47C 20/02* (2013.01); *A47C 20/04* (2013.01); *B60N 2/4879* (2013.01); *B60N 3/001* (2013.01)

(58) Field of Classification Search
CPC ....... B60N 2/4879; A47C 7/383; A47C 20/02; A47C 20/04; A47C 20/046; A47C 20/048
USPC ........................... 5/638, 636, 640
See application file for complete search history.

(56) References Cited

U.S. PATENT DOCUMENTS

| | | |
|---|---|---|
| 327,816 A | 10/1885 | Newbourg |
| 1,855,408 A | 4/1932 | Montenegro |
| 2,693,400 A | 11/1954 | Erickson |
| 3,386,392 A | 6/1968 | Gramm |

(Continued)

FOREIGN PATENT DOCUMENTS

| | | |
|---|---|---|
| CN | 202122397 | 1/2012 |
| EP | 2359720 A1 | 8/2011 |

(Continued)

OTHER PUBLICATIONS

"4 Secrets to Easier Breathing", Bottom Line Health, Feb. 1, 2014, bottomlinehealth.com/4-secrets-to-easier-breathing.

(Continued)

*Primary Examiner* — Timothy J Brindley
(74) *Attorney, Agent, or Firm* — Intrinsic Law Corp.; Stephen P. Cole

(57) ABSTRACT

A personal rest system includes a headrest shaped and sized to accept a frontal portion of a user's head. The headrest defines a central opening and substantially surrounds the user's face. The headrest includes at least one padded portion against which the user's head can be rested. A mechanically adjustable support frame is coupled to the headrest at an upper end of the adjustable support frame. The support frame is also coupled to a pivoting member at a lower end of said adjustable support frame. A base section is coupled to the pivoting member. The base section includes an attachment portion shaped and configured to mechanically mount the base section to a surface on which said rest system is placed.

7 Claims, 14 Drawing Sheets

(56) References Cited

U.S. PATENT DOCUMENTS

| | | | |
|---|---|---|---|
| 3,625,161 | A | 12/1971 | Rosner |
| 3,828,377 | A | 8/1974 | Fary |
| 5,044,026 | A | 9/1991 | Matthews |
| 5,046,433 | A | 9/1991 | Kramer et al. |
| 5,269,229 | A | 12/1993 | Akapatangkul |
| 5,370,060 | A | 12/1994 | Wang |
| 6,581,226 | B1 | 6/2003 | Brustein |
| 6,647,573 | B2 | 11/2003 | Corbin |
| 6,684,431 | B2 | 2/2004 | Splane, Jr. |
| 6,857,149 | B2 | 2/2005 | Hoggatt et al. |
| 7,036,168 | B1 * | 5/2006 | Knickerbocker ........ A47G 9/10 5/636 |
| 7,364,129 | B1 | 4/2008 | Levari, Jr. |
| 8,011,731 | B2 | 9/2011 | Goddu |
| 8,205,283 | B1 | 6/2012 | Russell |
| D683,463 | S | 5/2013 | Huggins |
| 8,468,628 | B1 | 6/2013 | Cheng |
| 8,528,978 | B2 | 9/2013 | Purpura et al. |
| 8,985,693 | B2 | 3/2015 | Purpura et al. |
| 9,402,482 | B2 * | 8/2016 | Miller .................... A47C 9/005 |
| 2002/0050009 | A1 | 5/2002 | Ley |
| 2002/0100846 | A1 * | 8/2002 | Tinsley ................. A61G 13/12 248/118 |
| 2003/0172462 | A1 * | 9/2003 | Hoggatt ............... A47C 20/026 5/657 |
| 2008/0269544 | A1 | 10/2008 | Atkin et al. |
| 2008/0303318 | A1 * | 12/2008 | Hamilton ............... A47C 16/00 297/129 |
| 2009/0236893 | A1 | 9/2009 | Ehlers et al. |
| 2010/0117435 | A1 | 5/2010 | Samuelsen |
| 2012/0181821 | A1 | 7/2012 | Edalati et al. |
| 2013/0007961 | A1 | 1/2013 | Noh |
| 2013/0232696 | A1 * | 9/2013 | Halimi .................. A47C 16/00 5/640 |
| 2014/0033439 | A1 * | 2/2014 | Berhanu ............... A47C 16/00 5/640 |
| 2015/0001905 | A1 * | 1/2015 | Jackow ............... B60N 2/4805 297/397 |
| 2016/0151221 | A1 * | 6/2016 | Mount .................... A47C 7/38 5/638 |

FOREIGN PATENT DOCUMENTS

| | | |
|---|---|---|
| EP | 2589535 A1 | 5/2013 |
| WO | WO2009108823 A1 | 9/2009 |
| WO | WO2010129652 A1 | 11/2010 |
| WO | WO2010138216 A1 | 12/2010 |
| WO | WO2011066994 A2 | 6/2011 |

OTHER PUBLICATIONS

E. Dean, "Effect of Body Position on Pulmonary Function", Physical Therapy, May 1985, p. 613-618, vol. 65, No. 5.

"Labor and birth: 1st Stage of Labor (part 5)—Positions for First Stage of Labor", women.programming4.us/health/labor-and-birth---1st-stage-of-labor-(part-5)---positions-for-first-stage-of-labor.aspx#3VQLHcqRwptV32BO.99.

"Getting the air you need: A practical guide to coping with and managing shortness of breath", Juravinski Cancer Centre Information for patients and families, Hamilton Health Sciences, Ontario, Canada.

"Why is exercise important", British Lung Foundation, www.blf.org.uk/Page/Why-is-exercise-important.

"Mind-Body Skills for Regulating the Autonomic Nervous System", Jun. 2011, Version 2, Defense Centers of Excellence for Psychological Health & Traumatic Brain Injury, Virginia.

Skyrest, "Skyrest Travel Pillow", sold by Planet Stuff, www.amazon.com/Skyrest-Travel-Pillow/dp/00GMQU948.

eZsnooZ, "eZsnooZ All Purpose Travel Cushion", via YouTube, uploaded Jul. 21, 2008, www.youtube.com/watch?v=IEaenYh-jFg.

Eugene, OR Website, "Diaphragm Deep Breathing", www.eugene-or.gov/DocumentCenter/View/14142.

Wikipedia, "Tripod position", Wkpedia, the free encyclopedia.

U.S. International Searching Authority, "Interational Search Report and Written Opinion of the International Searching Authority, App. No. PCT/US15/24817", Jul. 13, 2015, WIPO.

* cited by examiner

BODYREST

RELATED APPLICATIONS

This application is related and claims priority to U.S. Provisional Application No. 61/976,563, entitled "Headrest," filed on Apr. 8, 2014, and U.S. Provisional Application No. 62/127,612, entitled "Bodyrest," filed on Mar. 3, 2015, both of which are hereby incorporated herein by reference.

TECHNICAL FIELD

The present application generally relates to devices for supporting the body and more particularly to devices for supporting the head and upper body in a forward-leaning position.

BACKGROUND

Sleeping in the seated position is difficult for most people. There are occasions where and reasons why people desire rest and sleep but are unable to avoid the seated position, for example when the person is on an airplane, in a wheelchair, or at an office desk. Also, some people cannot sleep in bed due to back pain or other physical issues. The airline industry has attempted to address this issue by allowing passengers to recline in their seats. However, most economy and business class seats do not recline more than 35 degrees, which most people still find uncomfortable.

Many devices have been conceived and created to address this problem. However, none have solved this problem to a satisfying degree. Existing headrests, backrests, and bodyrest devices designed to be used while seated in the upright position (e.g., neck pillows, sleep aids and the like), can support, decrease pressure and reduce strain on the neck or back, but not both simultaneously. Thus comfort for the user is never fully realized. For example, neck pillows and neck supports are placed behind or next to the user. While such devices take the pressure off the neck, there is still considerable discomfort and strain on the back because the user is forced to hold herself upright by using other muscles. Backrests can reduce pressure from certain muscle groups in the back. However, the user is still required to hold himself upright using other muscle groups. Also, pressure and strain remain on the neck because the neck is not supported. Moreover, if the user does manage to fall asleep using a backrest, the user's head often tilts forward causing the person to wake up.

Some headrests can be used while the user leans forward (e.g., on an airplane tray table). However, such headrests are deficient in several aspects. For example, some of these headrests lack an opening for breathing so the user must turn her head to the side. This causes strain on and discomfort of the neck because the neck bears most of the pressure and weight. Also, the headrests do not support the user's upper body so must use certain back muscles to partially support the torso so that the neck does not bear all of the weight and pressure. Furthermore they are not adjustable in height or angle so users of different heights are not accommodated and proper alignment of the back and neck is not achieved. Also, there is no existing sleep or rest aid that allows the user to lean in a face-down, forward leaning position that is not only adjustable in height and in angle but is also collapsible and portable so that the user can easily transport and carry the device while traveling.

In addition, people with respiratory illnesses such as chronic obstructive pulmonary disease (there are approximately 3 million cases in the US per year) are frequently prescribed by doctors and physical therapists to rest in the supported forward-leaning position as an adjunct to medical treatment when breathing becomes difficult. Resting in such a lean forward position optimizes the mechanics of respiration by easing the work of the chest muscles and engaging the diaphragm allowing people to breath easier and deeper. People with certain back problems and pain such as those with herniated discs and pregnant women are also frequently prescribed by doctors to rest in the supported forward-leaning position to ease back pain. People who have herniated discs find both lying down and sitting up to be painful. The only way for people with herniated discs to get comfortable is to rest in the supported forward-leaning position because this position expands the spine easing pressure of the discs of the spine against the nerves and cartilage that are between and close to the discs. In addition, it is difficult for some people with muscular dystrophy to sit upright for long periods of time due to weakened back and neck muscles. Lying down or resting in the supported lean forward position is the only way to ease the pressure on the back and neck muscles. Some people with the conditions mentioned above are in so much pain that they must have access to places that they can rest in the forward leaning position often and for long periods of time making it difficult for them to leave their home and for them to work and be productive. Currently there is no device that is lightweight, portable and collapsible that allows people to rest in the supported lean forward position to relieve their pain symptoms when they are out of the home and when they are in the home they must resort to rest leaning forward against a pillow placed on a table or desk or sit backwards in a chair and lean against the back of the chair which is not ideal or comfortable. Others must purchase a costly and cumbersome forward leaning massage chair.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the disclosure is directed to a personal support system. The support system includes an annular frame for supporting a front of a user's head in a forward-leaning position. The support system also includes a stand having a first end and a second end. The first end defines a recess to receive a portion of the frame such that a position of the frame is adjustable within the recess to set a height of the frame. The support system also includes a chest support adjustably disposed on the stand. The support system also includes a base connected to the second end of the stand.

In some embodiments, the stand is rotatably connected to the base such that an angle of the stand is adjustable towards or away from the user. In some embodiments, the stand is adjustable from a stowed position to a deployed position.

The stand can have a length from a first end to a second end. The length of said stand can be parallel to the base in the stowed position. The length of the stand can be disposed at an angle with respect to the base in the deployed position. A height of the chest support can be adjustable with respect to the stand.

The base can includes a clamp adapted to receive an edge of a table. In some embodiments, the base is adjustable relative to the clamp along an axis of the base such that the base can adjustably move towards or away from the user while the clamp is disposed on the edge of said table. A channel can be defined in the base to slideably receive a pin projecting from a surface of the clamp to slide the base towards or away from the user. In some embodiments, the base can slide away from the edge of the table such that at least a portion of the chest support can be adjustably disposed below a plane defined by a surface of the table.

In some embodiments, the frame includes a first portion for supporting a forehead of a user in the forward-leaning position, a second support member for supporting a first cheek of the user in said forward-leaning position, and a third support member for supporting a second cheek of the user in the forward-leaning position.

Another aspect of the disclosure is directed to a bodyrest. The bodyrest includes a body having an upper portion and a lower portion. The upper portion of the body has a first arm and a second arm for supporting a front of a user's head in a forward-leaning position. The first and second arms define an aperture therebetween. The aperture is generally aligned with at least a portion of a face of the user in said forward-leaning position. A base is connected to a lower portion of the body.

Another aspect of the disclosure is directed to a personal rest system. The personal rest system includes a headrest shaped and sized to accept a frontal portion of a user's head. The headrest defines a central opening and substantially surrounds the user's face. The headrest has at least one padded portion against which the user's head can be rested. The personal rest system also includes a mechanically adjustable support frame coupled to the headrest at an upper end of the adjustable support frame and coupled to a pivoting member at a lower end of the adjustable support frame. The personal rest system also includes a base section coupled to the pivoting member. The base section includes an attachment portion thereof shaped and configured to mechanically mount the base section to a surface on which the rest system is placed.

The mechanically adjustable support frame can be adjustable in an upwardly and downwardly degree of freedom to accommodate users of various heights. The pivoting member can provide a rotational degree of freedom about an axis perpendicular to said adjustable support frame to accommodate a variety of tilt angles of said adjustable support frame and headrest with respect to said base section. The pivoting member further can be mechanically lockable in at a selected tilt angle with respect to said base section.

In some embodiments, the pivoting member allows rotation of said mechanically adjustable support frame with respect to said base section so that the rest system can be deployed in a configuration having a first angle between said adjustable support frame and said base section, and a stowed configuration having a second angle between said adjustable support frame and said base section, the first angle being greater than said second angle.

The base section can be adjustable in a forwards and backwards degree of freedom allowing the rest system to slide towards and away from said user. The attachment portion of the base section can include an open channel beneath the base section, the open channel facing away from the user, so as to accept an edge of the surface on which the rest system is placed. In some embodiments, the attachment portion of the base section includes an opposing pair of edges of the open channel so as to accept and mechanically grasp an edge of a table within the open channel.

A chest support can be disposed on the mechanically adjustable support frame on which the user's chest can be rested. The chest support can be upwardly and downwardly moveable along the mechanically adjustable support frame.

IN THE DRAWINGS

For a fuller understanding of the nature and advantages of the present invention, reference is be made to the following detailed description of preferred embodiments and in connection with the accompanying drawings, in which.

DETAILED DESCRIPTION

Figure 1:
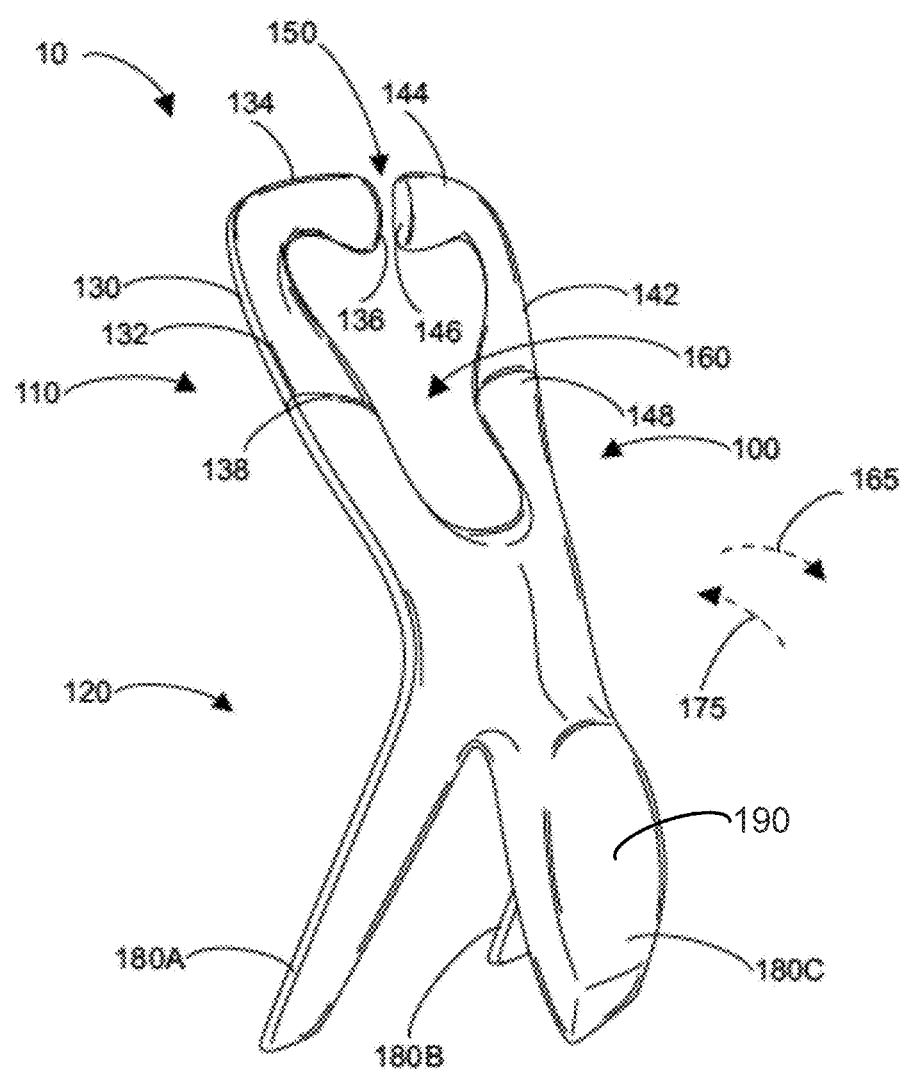
FIG. 1 illustrates a perspective view of a bodyrest according to an embodiment.

This disclosure describes bodyrests configured for users seated in a forward-leaning position. The bodyrest includes a head support mechanically connected to a body. The head support includes one or more support members that are configured to support one or more portions of a user's face, such as the user's forehead and/or the sides of the user's face (e.g., cheeks or jawline). The support members define an aperture or gap that is aligned with one or more sensory organs on the user's face. For example, the aperture or gap can be aligned with the user's mouth, nose, and/or eyes.

A chest support can be mechanically coupled and/or integrated with the elongated body. The chest support can include a pad or pillow to mechanically support the user's chest and upper body while a user's head is disposed in the bodyrest.

The base can have a generally planar surface to conform to a tabletop or airline tray table. In addition or in the alternative, the base can include a support member that defines an open channel that can grip an edge of a table or airline tray table.

The bodyrest can be adjusted along multiple degrees of freedom. For example, the height of the head support can be adjusted with respect to the body. In addition or in the alternative, the head support can pivot towards or away from the user to support the user's head at different positions and angles. In addition or in the alternative, the support members can be adjusted laterally to fit different size heads. In addition or in the alternative, a position of the chest support can be adjusted with respect to the elongated body so the chest support can have an adjustable height to accommodate different users. In addition or in the alternative, the body and/or the base can move towards or away from the user to adjust a distance between the user and the bodyrest.

In some embodiments, the bodyrest can be folded and/or broken down into various components for portability and storage.

The bodyrests disclosed herein can provide improved comfort for the user. The bodyrests can reduce pain and/or strain on the torso including the back, shoulders, and neck. In addition, the bodyrests can facilitate deeper, easier and/or more efficient breathing by allowing the user to rest in a supported forward-leaning position. For example, the bodyrests can reduce the workload of the chest muscles and prevent engaging the diaphragm.

Such bodyrests can be beneficial (e.g., as an adjunct to medical treatment) for users with respiratory diseases including chronic lung disease and/or for users with certain back problems, such as back problems that occur while traveling in an airplane seat.

It is understood that the present disclosure is often drafted in the context of a user sitting on a seat such as an airplane seat, but the present disclosure is not so limited, and can be applied to various types of users as would be appreciated by those skilled in the art with suitable modifications to the size and/or form factor of the device, without departing from the spirit of the disclosure. For example, the disclosure can be applied to users in a wheelchair, in a hospital setting, or at a desk.

FIG. 1 illustrates an embodiment of a foldable bodyrest 10 for a user in a forward-leaning position. The bodyrest 10 includes a body 100 having an upper portion 110 and a lower portion 120. The upper portion 110 includes a first support arm 130 and a second support arm 140. As illustrated, the first support arm 130 includes a first generally vertical section 132 and a first generally horizontal section 134. Likewise, the second support arm 140 includes a second generally vertical section 142 and a second generally horizontal section 144. The first and second horizontal sections 134, 144 extend inwardly towards each other. The first and second support arms 130, 140 can be generally symmetrical. The bodyrest 10 can be a personal support apparatus and/or a personal rest system.

When the user leans forward, the first and second support arms 130, 140 are disposed against the user's face to provide support thereto. For example, the first vertical section 132 of the first support arm 130 can be disposed against a first side of a user's face, such as the user's first cheek. The first horizontal section 134 of the first support arm 130 can be disposed against a top of the user's face, such as a first portion of the user's forehead. Likewise, the second vertical section 142 of the second support arm 140 can be disposed against a second side of a user's face, such as the user's second cheek. The second horizontal section 134 of the second support arm 140 can be disposed against a top of the user's face, such as a second portion the user's forehead.

A gap 150 is disposed between a first end 136 of the first horizontal section 134 and a second end 146 of the second horizontal section 144. The gap 150 allows the first and second support arms 130, 140 to flexibly adjust to the size of the user's face (e.g., the size of the user's forehead).

The first and second support arms 130, 140 define an aperture 160 therebetween. The aperture 160 is generally aligned to a user's face when the user is in a forward-leaning position. For example, the user's mouth, nose, and/or eyes can be aligned with the aperture 160. The aperture 160 allows the user to breathe easily while using the bodyrest 10 and to do various activities such as speak, sleep, read, look at a computer or tablet, etc.

The first and second vertical sections 132, 142 of the first and second support arms 130, 140 include first and second creases 138, 148, respectively. The creases 138, 148 allow the support arms 130, 140 to fold approximately in half for storage and/or portability. The support arms 130, 140 can fold towards the user in a first direction 165 while the support arms 130, 140 support the user in a second direction 175 away from the user. It is noted that the first and second arms 130, 140 can include additional creases and/or folds as would be recognized by those skilled in the art.

The lower portion 120 of the body 100 includes three legs 180A, 180B, and 180C. Legs 180A and 180B are disposed away from the user while leg 180C is disposed towards the user to form a tripod-like stand. The legs 180A-C can pivot with respect to the body 100 to a partially portable or stowed position. In the partially-stowed position, the legs 180A-C are aligned with respect to the upper portion 120 of the body 100 to form a generally planar surface, thus reducing the size of the body 100 along an axis orthogonal to the planar surface. As recognized by those skilled in the art, the bodyrest 10 can include additional or fewer legs 180A-C. Likewise, the legs 180A-C can be in different configurations, such as two legs disposed towards the user and one leg disposed away from the user.

At least one leg 180C includes a chest support 190. The chest support 190 includes a cushion and/or a rubber-like material for supporting the user's chest when the user is seated in a forward-leaning position. The chest support 190 can provide additional comfort to the user by supporting a portion of the user's weight. In some embodiments, a height and/or position of the chest support 190 is adjustable to provide a degree of freedom. For example, the chest support 190 can be removably attached to the leg 180C (e.g., with a hook and loop fastener).

Figure 2:
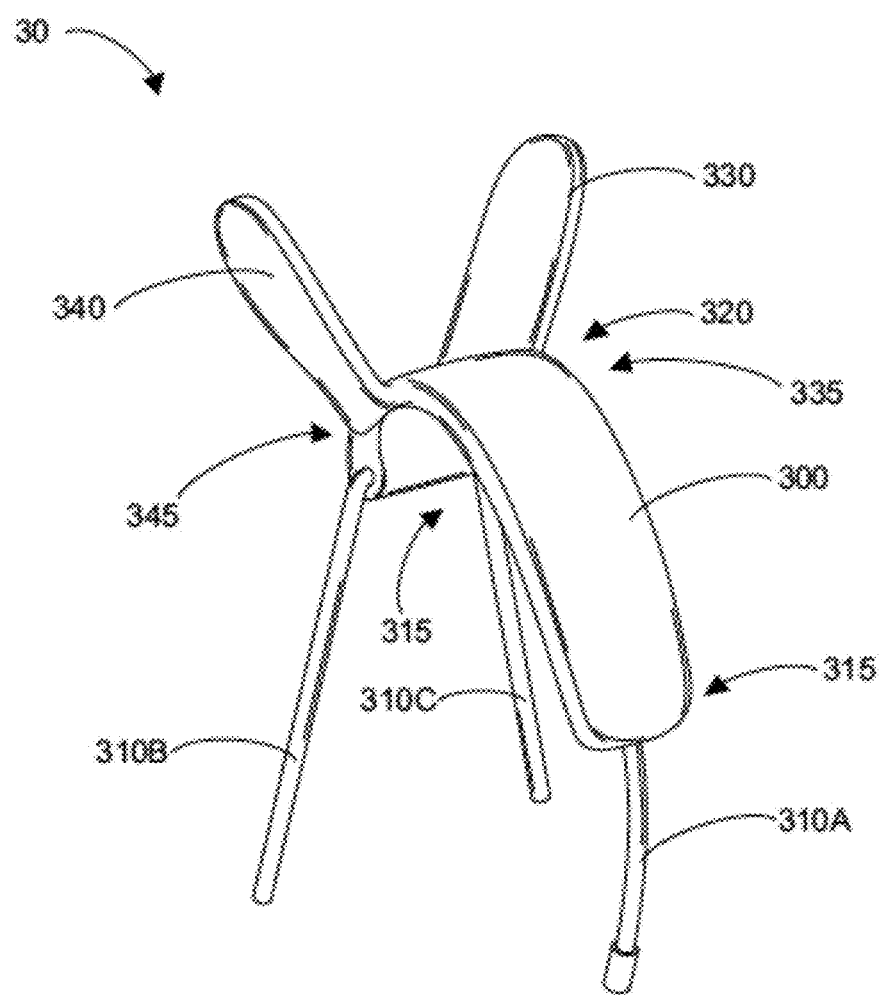
FIG. 2 illustrates a perspective view of a bodyrest according to an embodiment.

FIG. 2 illustrates an embodiment of a bodyrest 30 or personal support system for a user seated in a forward-leaning position. The bodyrest 30 includes a central body 300 coupled to legs 310A, 310B, 310C. The body 300 is generally elongated from a first end 315 to a second end 320. In addition, the body 300 is arched 315 away from the legs 310A-C from the first end 315 to the second end 320. The first end 315 is disposed proximally a user. The second end 320 is disposed distally to the user. Lateral supports 330, 340 are coupled to opposing sides 335, 345, respectively, of the second end 320 of the body. The bodyrest 30 can be a personal support apparatus and/or a personal rest system.

The legs 310A-C mechanically mount to and/or support the body 300 on a surface 350. In some embodiments, a height of the legs 310A-C is mechanically adjustable (e.g., telescoping) to accommodate users of various heights to provide a degree of freedom. In addition or in the alternative, the legs 310A-C are removable and/or pivotable for enhanced storage and portability.

In use, the arch 315 in the body 300 conforms and provides support to the user's torso/chest while the second end 320 of the body 300 supports the bottom of the user's head (e.g., the user's chin). The lateral supports 330, 340 can be configured to rest against opposing sides of the user's face (e.g., along the temples and/or cheeks) while using the bodyrest 30.

Figure 3:
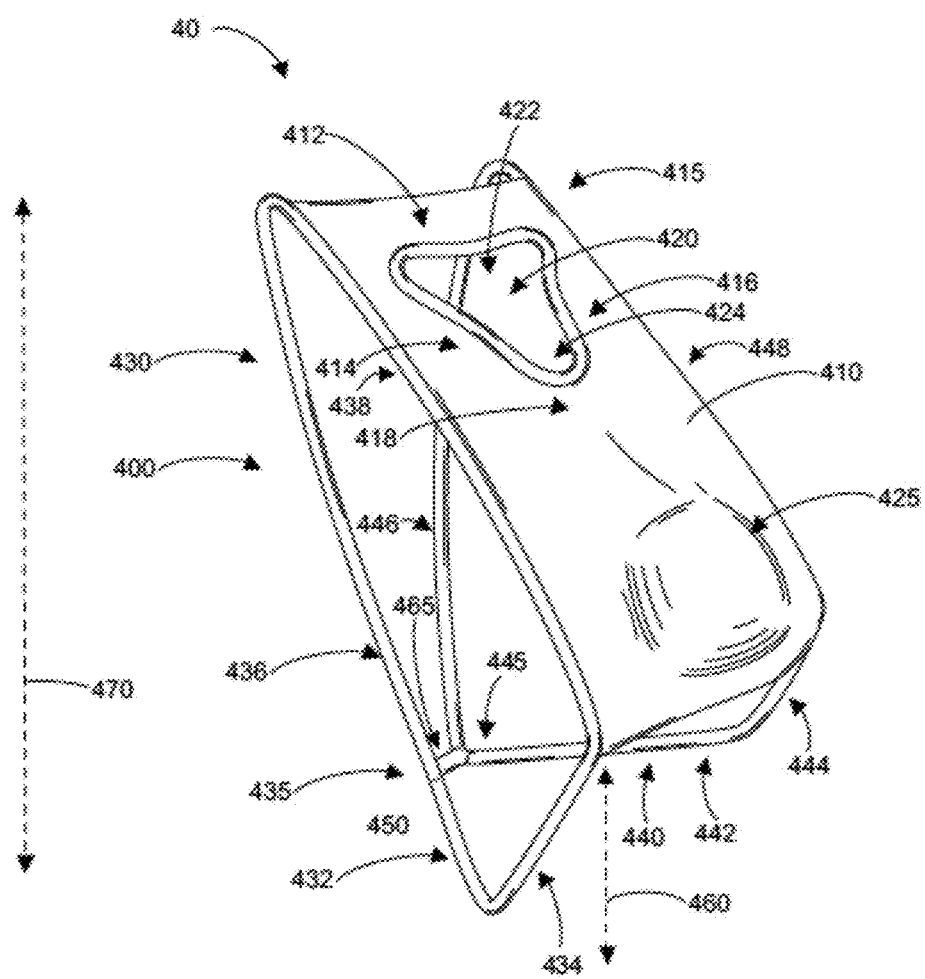
FIG. 3 illustrates a perspective view of a bodyrest according to an embodiment.

FIG. 3 illustrates a perspective view of an embodiment of a bodyrest 40 for a user seated in a forward-leaning position. The bodyrest 40 can be a personal support apparatus and/or a personal rest system.

The bodyrest 40 includes a stretchable support 410 mounted on a frame 400. The support 410 defines an aperture 420 at a first end 415 thereof for receiving a portion of the user's face. The aperture 420 includes a first part 422 that generally aligns with the user's eyes and a second part 424 that generally aligns with the user's nose and mouth. A first portion 412 of the support 410 above the first part 422 of the aperture 420 is disposed against the user's forehead to provide mechanical support thereto. Second portions 414, 416 of the support 410 are disposed against the sides (e.g., cheeks) of the user's face to provide mechanical support thereto. A third portion 418 of the support 410 is disposed against the bottom of the user's face (e.g., chin) to provide mechanical support thereto. The stretchable support 410 can be made out of an elastic, nylon, LYCRA®, spandex, or the like.

A chest support 425 is disposed at a second end 418 of the support 410. The chest support 425 can include a cushion, a rubberized material, or similar device for mechanically supporting the user's chest. The chest support 425 can be adjustable and/or removable to provide a degree of freedom.

The frame 400 includes first and second sections 430, 440. Each section 430, 440 includes a respective base portion 432, 442, a respective front stand portion 434, 444, a respective rear stand portion 436, 446, and a respective support portion 438, 448. The base portions 432, 442 are disposed against a surface 450 such as the ground or tabletop (e.g., a tray tabletop) to mount the bodyrest 40 for use. The base portions 432, 442 are connected together at respective distal ends 435, 445 with a coupling 465 such as a wire. The coupling 465 can enhance the mechanical strength of the frame 400.

The front stand portions 432, 442 and rear stand portions 436, 446 are coupled to the respective base portions 432, 442 and to the respective support portions 438, 448. In general, the front stand portions 432, 442 have a first height 460 and the rear stand portions 436, 446 have a second height 470, which is less than the first height 460. The front stand portions 432, 442 and rear stand portions 436, 446 provide mechanical support and alignment for a height and an angle of the respective support portions 438, 448. The support portions 438, 448 extend at a reclined angle from the first height 460 to the second height 470 to generally align with the user's chest and head in a forward-leaning position. The support portions 438, 448 mechanically support the stretchable support 410 similar to a hammock.

Figure 4:
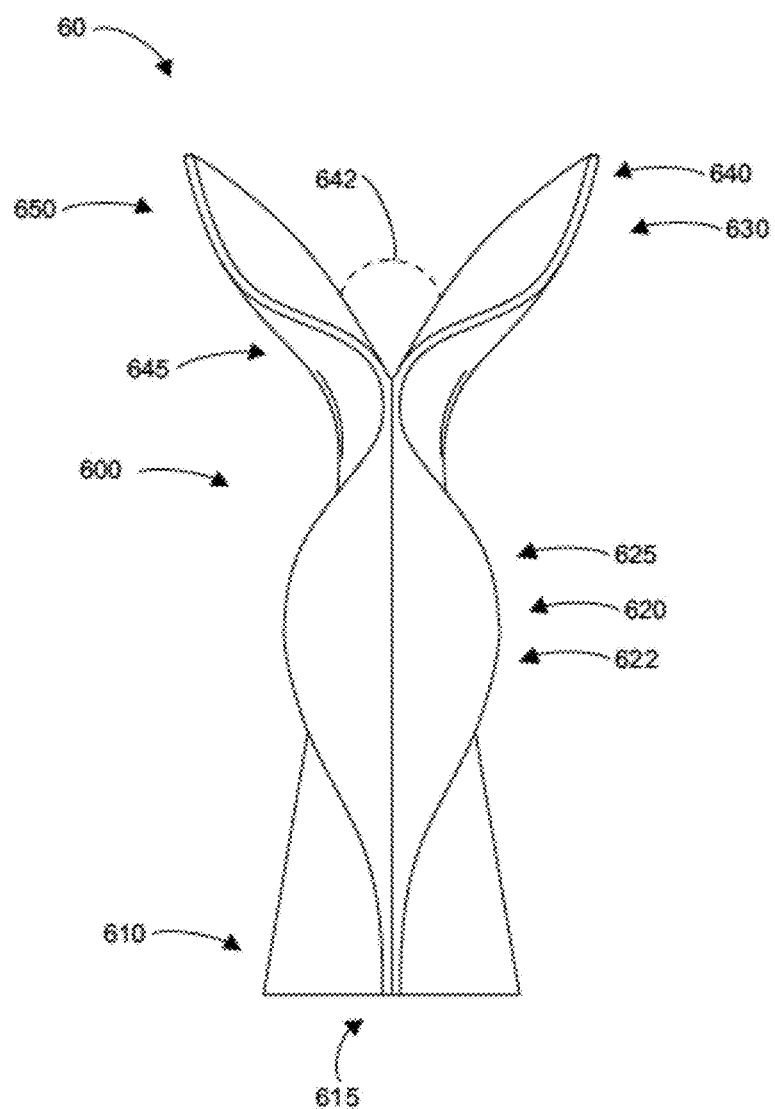
FIG. 4 illustrates a front view of a bodyrest according to an embodiment.

FIG. 4 illustrates an embodiment of a bodyrest 60 for a user seated in a forward-leaning position. The bodyrest 60 includes a generally elongated body 600 having a base 610, a chest support 620, and a head support 630. The base 610 has an exposed surface 615 that is generally planar for supporting the body 600 on a flat surface such as a tabletop, an airplane tray table, etc. The bodyrest 60 can be a personal support apparatus and/or a personal rest system.

The chest support 620 has an exposed surface 622 and a generally curved edge 625. The exposed surface 622 is positioned against a user's chest to provide support thereto. The chest support 620 can include a cushion and/or a rubber-like material for supporting the user's chest when the user is seated in a forward-leaning position. The chest support 620 can provide additional comfort to the user by supporting a portion of the user's weight. The chest support 620 and body 600 can have a curved profile, which can conform to a user's chest and/or upper body when the user is seated in a forward-leaning position. In some embodiments, the chest support 620 is adjustable and/or removable to provide a degree of freedom.

The head support 630 includes a first support arm 640 and a second support arm 650. The first and second support arms 640, 650 are disposed at an angle 642 with respect to one another to form a structure similar to a V. A chin support 645 is formed at the intersection of the support arms 640, 650 (i.e., at the vertex of the "V"). The support arms 640, 650 are aligned with opposing sides of a user's face to provide support thereto when the user is seated in a forward-leaning position. The support arms 640, 650 can be aligned with the user's cheeks, jawbone, forehead, and/or another portion of the front and/or side of the user's head. The support arms 640, 650 are moveable towards or away from each other to adjust a position of the support arms 640, 650 on the user and to provide a degree of freedom.

Figure 5:
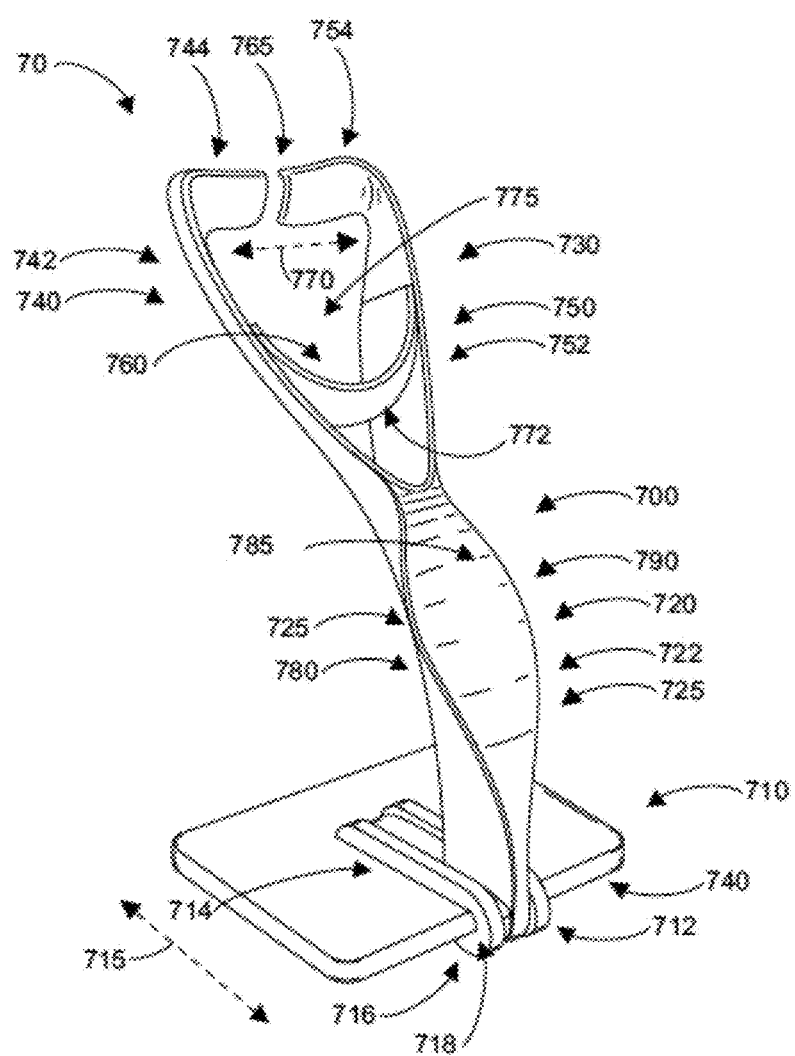
FIG. 5 illustrates a perspective view of a bodyrest according to an embodiment.

FIG. 5 illustrates an embodiment of a bodyrest 70 for a user seated in a forward-leaning position. The bodyrest 70 can be a personal support apparatus and/or a personal rest system.

The bodyrest 70 includes a body 700 connected to a base 710. The base 710 includes a U-shaped attachment member 712 comprising a top portion 714 and a bottom portion 716. The top portion 714 and bottom portion 716 define an open channel 718 to receive an edge 740 of a table, an airplane tray table, etc. on which the bodyrest 70 is placed. The open channel 718 faces away from the user when the user uses the bodyrest 70 so that the user pushes the base 710 against the edge 740 of the table. Thus, the open channel 718 can anchor or mount the bodyrest 70 to the edge 740 of the table. In some embodiments, at least a portion of the open channel 718 is narrower than the edge 740 of the table such that the top and bottom portions 714, 716 of the attachment member 712 can mechanically grasp the edge 740 of the table.

The body 700 includes a chest support 720 and a head support 730. The chest support 720 has an exposed surface 722 and a generally curved edge 725. The exposed surface 722 is positioned against a user's chest to provide support thereto, as discussed above. The chest support 720 can include a cushion and/or a rubber-like material for supporting the user's chest when the user is seated in a forward-leaning position. The chest support 720 can provide additional comfort to the user by supporting a portion of the user's weight. The chest support 720 can have a curved profile, which can conform to a user's chest and/or upper body when the user is seated in a forward-leaning position. The chest support 720 can be adjustable and/or removable as discussed above.

The head support 730 includes a first support arm 740, a second support arm 750, and a chin support 760. The first and second support arms 740, 750 are configured to support opposing sides of the user's face and a top of the user's face (e.g., the forehead) when the user is seated in a forward-leaning position. The support arms 740, 750 include respective vertical portions 742, 752, and horizontal portions 744, 754. The vertical portions 742, 752 can generally align with opposing sides of the user's face, as described above. The horizontal portions 744, 754 generally align with the top of the user's face. The horizontal portions 744, 754 define a gap 765 therebetween, which allows the arms 740, 750 to flex inwardly or outwardly along a direction 770 parallel to the horizontal portions 744, 754. By flexing the arms 740, 750, the head support 730 can adjust to accommodate users with different head sizes.

The chin support 760 is a curved structure that extends from the first support arm 740 to the second support arm 750. The curve 772 generally conforms to and aligns with the user's chin.

The arms 740, 750 and the chin support 760 define an aperture 775. The aperture 775 is generally aligned to a user's face when the user is seated in a forward-leaning position. For example, the user's mouth, nose, and/or eyes can be aligned with the aperture 775. The aperture 775 provides an air path for the user and it allows the user to do various activities such as speak, sleep, read, look at a computer or tablet, etc. while using the bodyrest 70.

In some embodiments, the body 700 is adjustable along a length 715 of the base 710 to move of the body 700 towards or away from the user. In some embodiments, a screw is disposed in the top portion 714 and/or the bottom portion 716 of the base 710 to enhance the mechanical coupling of the base 710 and/or the attachment member 712 to the edge 740 of the table.

For storage, the body 700 and base 710 can split into first and second halves 780, 790 along a central seam 785. The central seam 785 extends to the chin support 760 and is aligned with the gap 765 between the arms 740, 750. A securing mechanism (e.g., one or more screws) secures the halves 780, 790 together when the bodyrest 70 is in use.

Figure 6:
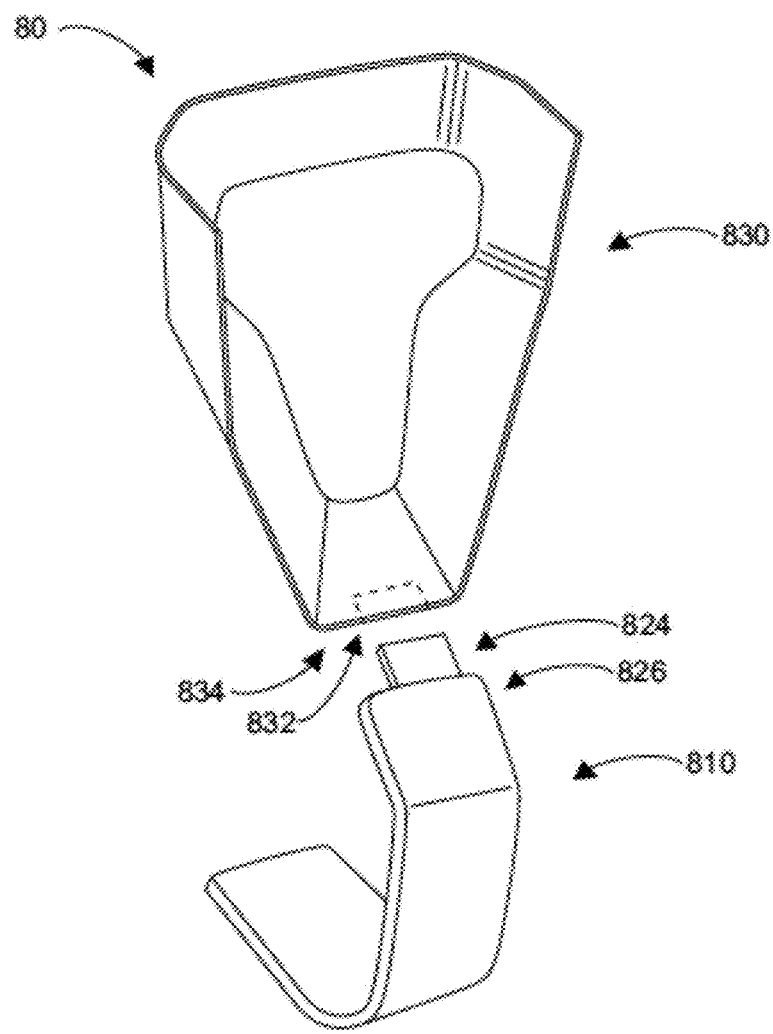
FIG. 6 illustrates a perspective view of a bodyrest according to an embodiment.

FIG. 6 illustrates a perspective view of an embodiment of a bodyrest 80 for a user seated in a forward-leaning position. The bodyrest 80 can be a personal support apparatus and/or a personal rest system.

The bodyrest 80 includes a base 810 mechanically connected to a head support 830. The base 810 includes a stand portion 812, a vertical portion 814, and an inclined portion 816. The vertical portion 814 is disposed between the stand portion 812 and the inclined portion 816. The stand portion 812 is generally planar to conform to a tabletop, a top surface of an airplane tray table, or similar mounting surface. The vertical portion 814 extends along a height 820 that is approximately orthogonal to a plane 818 defined by the stand portion 812. An optional chest support 825 is disposed on the vertical portion 814. The inclined portion 816 is disposed at approximately a 45-degree angle with respect to the height 820 of the vertical portion 814. It is noted that the inclined portion 816 can be disposed at other angles with respect to the height 820, such as 15 degrees, 30 degrees, 60 degrees, or 75 degrees.

A male connector 824 is disposed at a distal end 826 of the inclined portion 816. When the bodyrest 80 is in an assembled configuration the male connector 824 is disposed in a recess 832 defined in a proximal end 834 of the head support 830 to mechanically connect the head support 830 with the base 810. Likewise, the head support 830 and base 810 can be separated (e.g., for storage or travel) by removing the connecter 824 from the recess 832.

The head support 830 comprises a generally annular body 835 shaped to conform to a user's face while seated in a forward-leaning position. The body 835 includes a lower portion 840, side portions 845, and an upper portion 850. The lower portion 840 can be aligned with a user's chin when the user is seated in a forward-leaning position. The side portions 845 can be aligned with respective sides of a user's face (e.g., cheeks) when the user is seated in a forward-leaning position. The upper portion 850 can be aligned with the top of a user's head (e.g., forehead) when the user is seated in a forward-leaning position. A temple support portion 855 can extend from the upper portion 850 towards the user to support a user's temple. An aperture 860 is defined by the annular body 835. The aperture 860 can be aligned with one or more sensory organs on the user's face, such as the eyes, nose, and/or mouth.

Figure 7A:
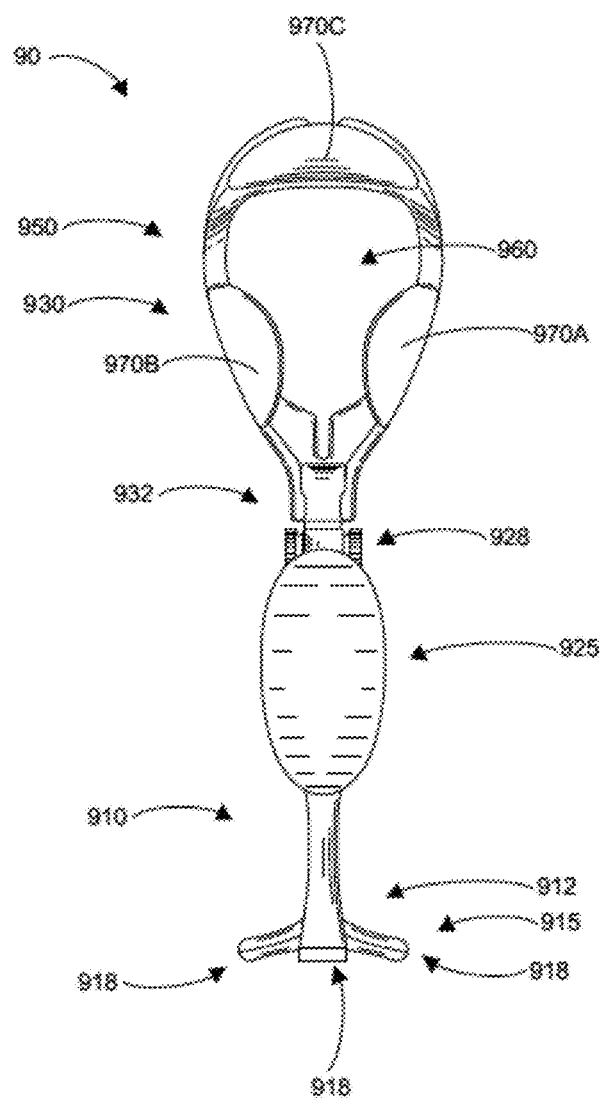
FIG. 7A illustrates a front view of a bodyrest according to an embodiment.

FIG. 7 illustrates an embodiment of a bodyrest 90 for a user seated in a forward-leaning position. The bodyrest 90 can be a personal support apparatus and/or a personal rest system.

Figure 7B:
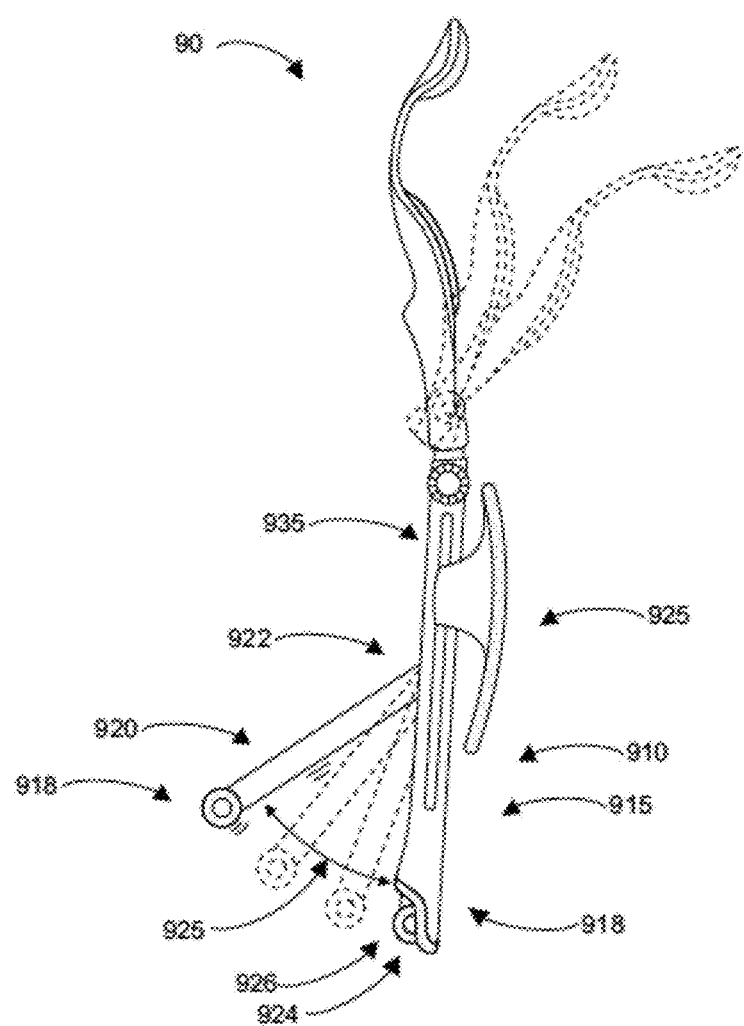
FIG. 7B illustrates a side view of a bodyrest according to an embodiment.

The bodyrest 90 includes an elongated body 910 that is mechanically coupled to a head support 930. The body 910 includes a support stand 915 disposed at a first end 912 of the body. The support stand 915 is formed of multiple legs 918. Some of the legs 918 are disposed on an optional secondary support arm 920 as illustrated in FIG. 7B, which shows a side view of the bodyrest 90. At least one leg 918 includes an optional notch 924 to conform the leg 918 to an edge 926 of a table or similar working surface.

Returning to FIG. 7B, a proximal end 922 of the secondary support arm 920 is rotatably coupled to the body 910 as indicated by arrow 925. The secondary support arm 920 can rotate from a first position where the secondary support arm 920 is approximately parallel to the body 910 to a second position where the secondary support arm 920 is disposed at approximately 45-degree angle with respect to the body 910. Those skilled in the art will recognize that the secondary support arm 920 can be adjustably disposed at a wide range of angles with respect to the body 920, as indicated by the arrow 925, including 15 degrees, 30 degrees, 60 degrees, 75 degrees, 90 degrees, or any angle therebetween. In some embodiments, the secondary support arm 920 can lock at one or more angles to customize the angle of the secondary support arm 920 and/or the body 910 to provide a degree of freedom for the bodyrest 90.

A chest support 925 is disposed on the body 910. The chest support 925, as discussed above, provides support to a user's chest and upper body while using the bodyrest 90. The chest support 925 is optionally adjustable along a length of the body 910 in a groove 935 to provide an additional degree of freedom for the bodyrest 90. The chest support 925 can be locked at given height/position with a knob 928 or similar device (e.g., a screw, a clamp, etc.).

Returning to FIG. 7A, the head support 930 includes an annular frame 950 that defines an aperture 960 that aligns with a user's face, as discussed above. A plurality of support pads 970A-C are disposed on the frame 950. The pads 970A-C are aligned with certain features of a user's face, such as the user's cheeks (e.g., pads 970A, B) and forehead (e.g., pad 970C). The pads 970A-C can be adjustable along the frame 950, for example using a hook-and-loop fastener (e.g., Velcro®), an adhesive, a peg, etc. In addition, the head support 930 is optionally pivotably connected to the base 910 at a joint 932. Using the joint 932, the head support 930 can pivot towards or away from the chest support 925, as illustrated in FIG. 9B. The pivot angle of the head support 930 can be locked into place using a tightening mechanism, such as a screw. For a more compact, stowed configuration, the head support 930 can pivot 180 degrees towards the chest support 925 so that the head support 930 is disposed against the chest support 925.

FIGS. 8A-8E illustrate various perspectives of a body support 1000. The bodyrest 1000 can be a personal support apparatus and/or a personal rest system.

Figure 8A:
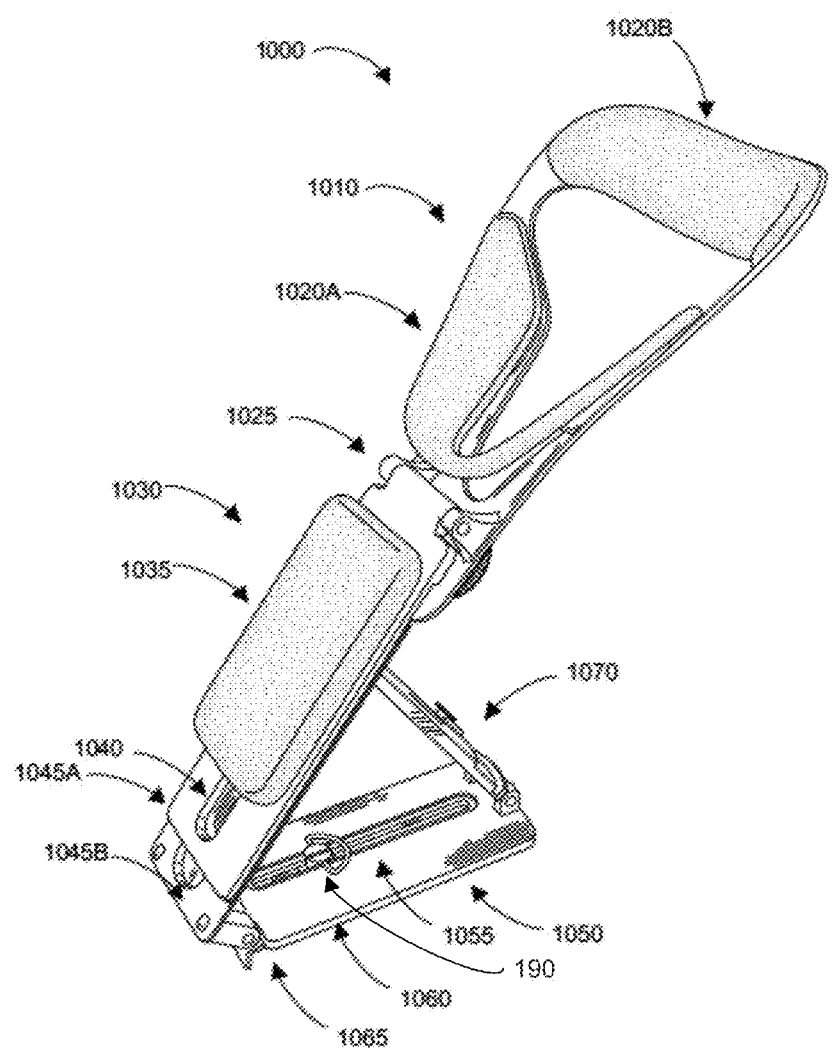
FIG. 8A illustrates a perspective view of a bodyrest according to an embodiment.
Figure 8B:
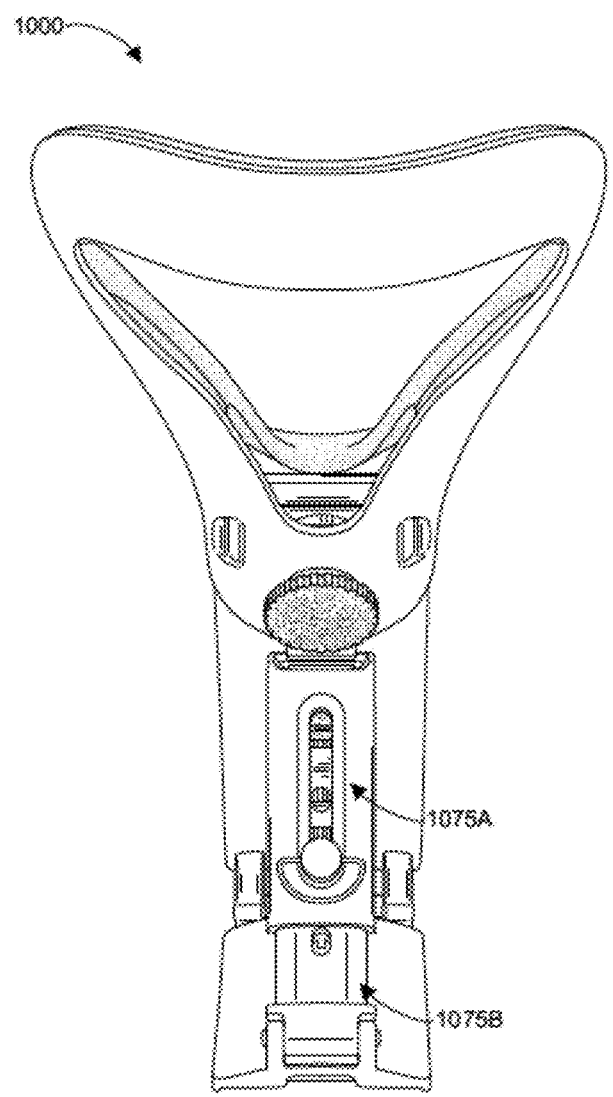
FIG. 8B illustrates a rear view of a bodyrest according to an embodiment.
Figure 8C:
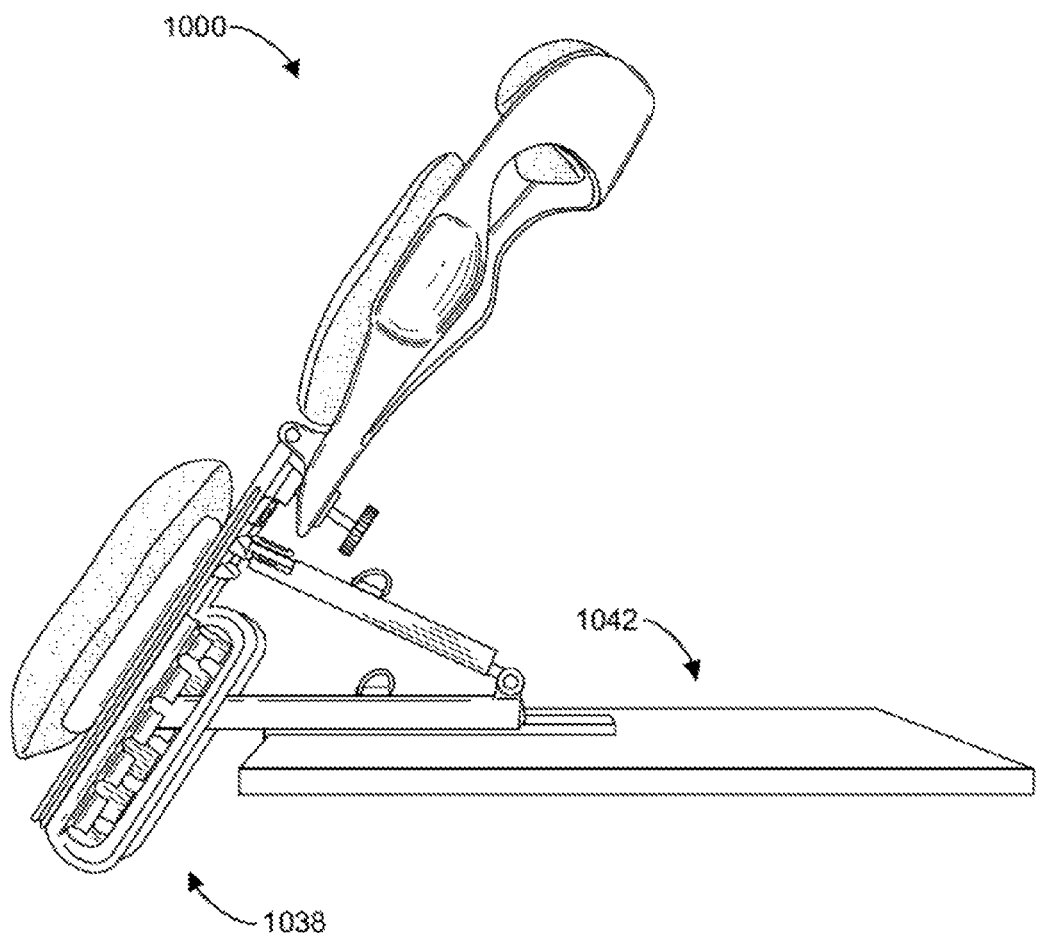
FIG. 8C illustrates a side view of a bodyrest according to an embodiment.
Figure 8D:
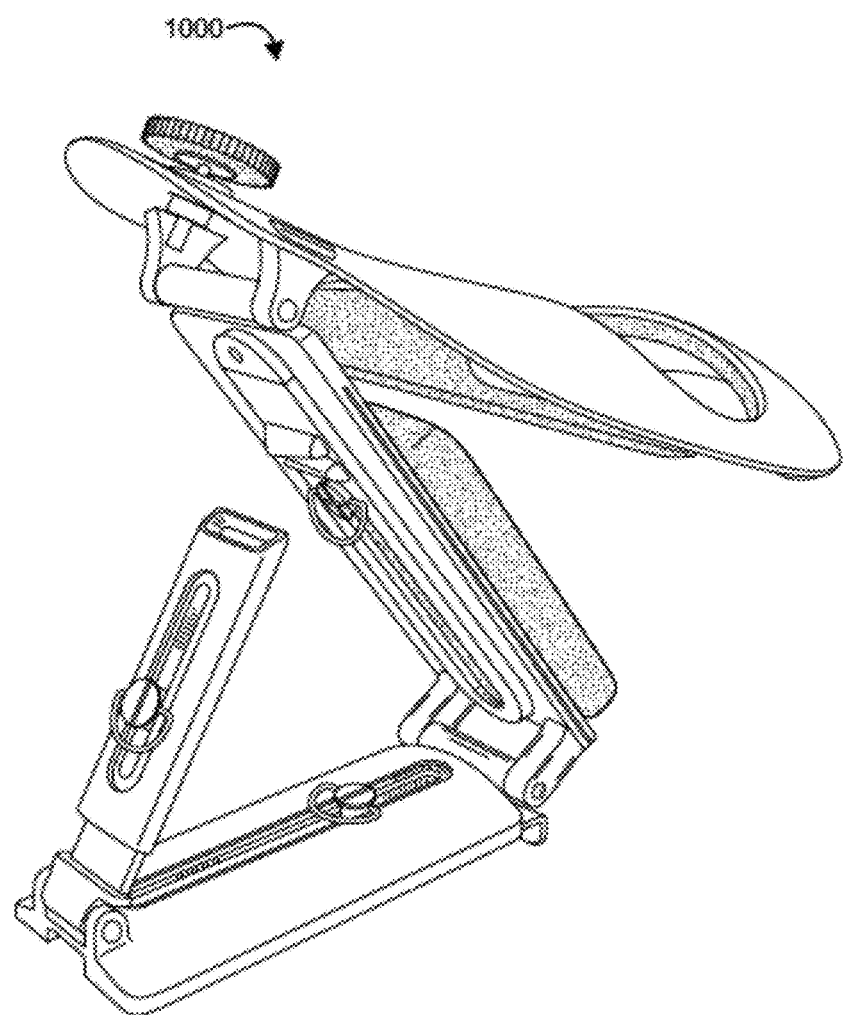
FIG. 8D illustrates a perspective view of a bodyrest according to an embodiment.
Figure 8E:
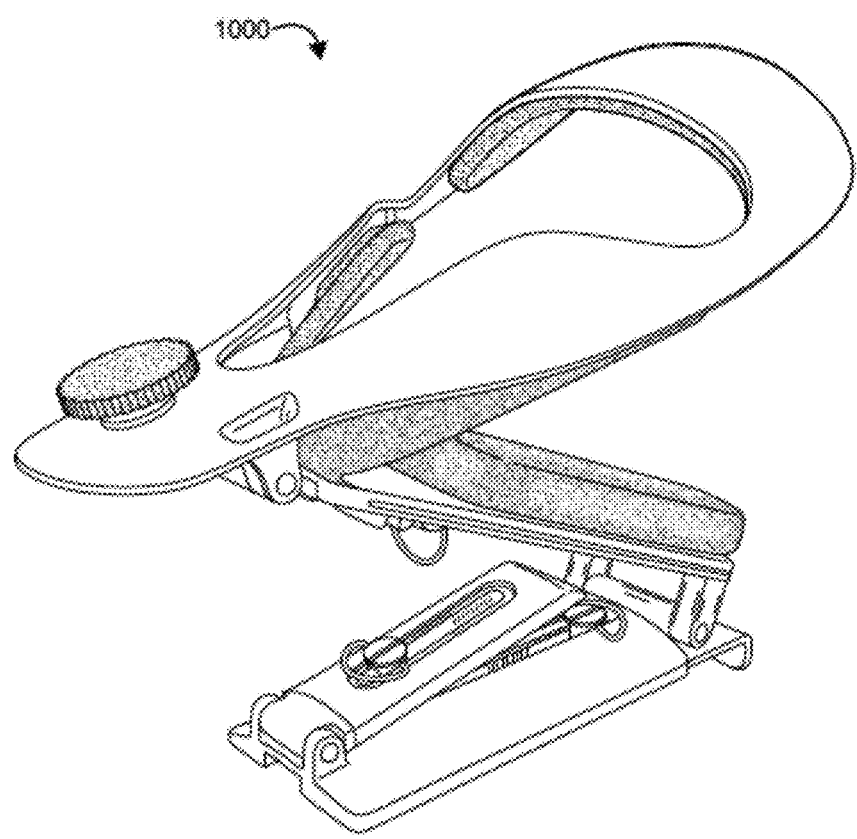
FIG. 8E illustrates a perspective view of a bodyrest according to an embodiment.

The body support 1000 includes various adjustable components for customization in various degrees of freedom. The body support 1000 includes a head support 1010 having an annular frame. Pads 1020A, 1020B are mounted on the frame to support the user's face (e.g., chin and forehead). The frame is pivotably attached to a body 1030 at a pivot point 1025 thus allowing the frame to fold towards the body 1030 for storage (e.g., as illustrated in FIGS. 8D and 8E). The head support 1010, pads 1020A, 1020B, and/or frame can include a receptacle for an aromatherapy cartridge.

A chest support 1035 is attached to the body 1030. The chest support 1035 can adjustably slide along a groove 1040 for custom positioning of the chest support 1035 at a desirable height for a user. The chest support 1035 can lock at desired position in the groove 1040, for example with a pin, a ratcheting mechanism, or similar structure.

The body 1030 includes a first plate 1045A and a second plate 1045B. The plates 1045A, 1045B can slide with respect to each other to shorten or lengthen the body 1035. By adjusting the length of the body 1035, the body support 1000 can be adjusted to a customized height (e.g., a longer body 1030 for a taller user).

The body 1030 is mechanically connected to an adjustable base 1050. The base 1050 defines a groove 1055 for sliding a base plate 1060 with respect to a clamp 1065, which is configured to attach to a table or working surface. By adjusting the base 1050, the chest support 1035 and the head support 1010 can be positioned towards or away from a user. A pin 1058 extends from the clamp 1065 to slide/adjust the base plate 1060 as described above.

In some embodiments, the base 1050 can slide away from the clamp 1065 and the table/working surface (and towards the user). The base 1050 can overhang the table/working surface to allow the body 1030 and/or chest support 1035 to slide (e.g., using saw tooth mechanism 1038) below a plane defined by a top surface 1042 of the table or the working surface as illustrated in FIG. 8C. Support arms 1070, 1072 are configured to support the body 1030 and/or chest support 1035. Using this configuration, the bodyrest 1000 can accommodate a wide range of users while being placed on a table/working surface at various heights.

An adjustable support arm 1070 is disposed between the base 1050 and the body 1030 to provide mechanical support to the body 1030. The support arm 1070 can lengthen or shorten by sliding respective support arm members 1075A, 1075B (e.g., as illustrated in FIG. 8B), which causes the body 1030 and chest support 1035 to pivot towards or away from the user. The support arms 1070, 1072 can have a quick release attachment mechanism, which can allow the bodyrest 1000 to be collapsed easily into a stowed configuration, as described below.

In some embodiments, a light source is integrated into or attached to the base 1050 and/or the frame. A user can use the light source for reading, etc. while using the bodyrest 1000.

Figure 8F:
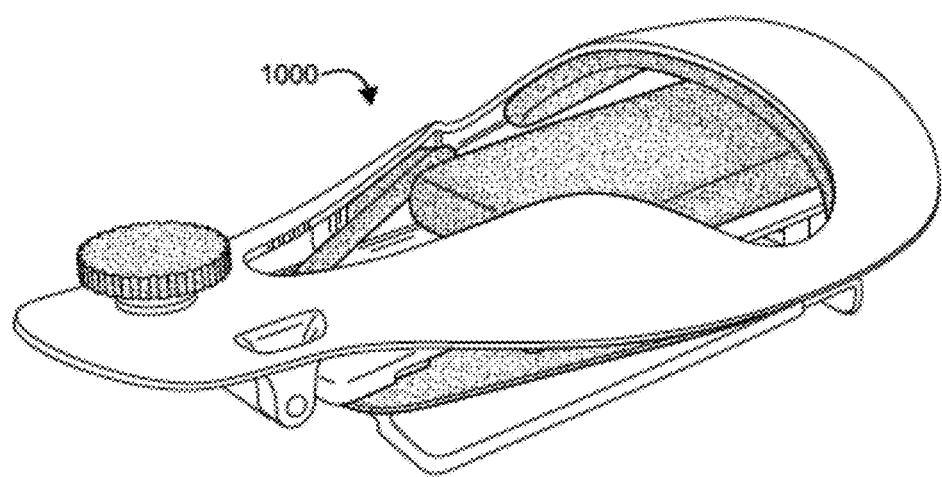
FIG. 8F illustrates a perspective view of a bodyrest according to an embodiment.

The body support 1000 can collapse into a stowed configuration as illustrated in FIGS. 8D through 8F. To collapse, the support arm 1070 detaches from the body 1030, which allows the support arm 1070 and body 1030 to pivot inwardly towards the base 1050. In addition, the head support 1010 pivots towards the body 1030. In the stowed configuration, the head support 1010, the support arm, the body 1030, and the base 1050 can be disposed substantially parallel to one other, as illustrated in FIG. 8F. The support 1000 is substantially smaller (e.g., in the vertical direction) in the stowed configuration, which is advantageous for portability (e.g., during travel).

The present disclosure should not be considered limited to the particular embodiments described above. For example, one or more of the bodyrests described herein can be adapted for a wheel chair, an arm chair, or other configuration. As a specific example, the bodyrest can include elongated lower supports and/or legs that are configured to support the bodyrest on the arms of a wheel chair and/or between the user's legs while positioning the bodyrest at a height appropriate for the seated user. Similarly, the bodyrest can be configured to rest on or attach to a table that lays across the arms of a wheel chair and/or on the user's lap. Additional modifications, equivalent processes, as well as numerous structures to which the present disclosure may be applicable, will be readily apparent to those skilled in the art to which the present disclosure is directed upon review of the present disclosure.

What is claimed is:

1. A personal support apparatus comprising:
   an annular frame for supporting a front of a user's head while seated in a forward-leaning position;
   a stand having a first end and a second end, said first end defining a recess to receive a portion of said frame, wherein a position of said frame is adjustable within said recess to set a height of said frame with respect to a user;
   a chest support adjustably disposed on said stand; and
   a base connected to said second end of said stand, wherein said base includes a clamp adapted to receive an edge of a table, and wherein said base is adjustable relative to said clamp along an axis of said base such that said base can adjustably move towards or away from said user while said clamp is disposed on said edge of said table.

2. The apparatus of claim 1, wherein said stand is rotatably connected to said base such that an angle of said stand is adjustable towards or away from said user.

3. The apparatus of claim 2, wherein said stand is adjustable from a stowed position to a deployed position, said stand having a length from said first end to said second end, said length of said stand being parallel to said base in said stowed position, and said length of said stand being disposed at an angle with respect to said base in said deployed position.

4. The apparatus of claim 1, wherein a channel defined in said base slideably receives a pin projecting from said clamp to slide said base towards or away from said user.

5. The apparatus of claim 4, wherein said base can slide away from said edge of said table such that at least a portion of said chest support can be adjustably disposed below a plane defined by a surface of said table.

6. The apparatus of claim 1, wherein a height of said chest support is adjustable with respect to said stand.

7. The apparatus of claim 1, wherein said frame includes a first support member for supporting a forehead of a user in said forward-leaning position, a second support member for supporting a first cheek of said user in said forward-leaning position, and a third support member for supporting a second cheek of said user in said forward-leaning position.

* * * * *